United States Patent [19]
Gray et al.

[11] Patent Number: 5,399,121
[45] Date of Patent: Mar. 21, 1995

[54] VEHICLE AIR DISTRIBUTION SYSTEM WITH IMPROVED SPACE UTILIZATION

[75] Inventors: Gerard P. Gray, Rochester Hills; Todd M. Irwin, Chesterfield, both of Mich.

[73] Assignee: General Motors Corporation, Detroit, Mich.

[21] Appl. No.: 203,174

[22] Filed: Feb. 28, 1994

[51] Int. Cl.$^6$ ............................................. B60H 1/26
[52] U.S. Cl. ................................. 454/137; 454/124; 454/903
[58] Field of Search ................. 454/76, 107, 108, 109, 454/121, 124, 137, 136, 306, 903

[56] References Cited

U.S. PATENT DOCUMENTS

| | | |
|---|---|---|
| 2,413,997 | 1/1947 | Rosa ................................. 15/104.05 |
| 3,593,645 | 7/1971 | Day et al. . |
| 4,132,158 | 1/1979 | Kania et al. . |
| 4,662,269 | 5/1987 | Tartaglino . |
| 4,811,760 | 3/1989 | Van Kirk et al. ..................... 138/115 |
| 5,094,273 | 3/1992 | Eagleton ............................. 138/107 |
| 5,111,739 | 5/1992 | Hall .................................. 454/306 |
| 5,170,986 | 12/1992 | Zelczer et al. ...................... 251/61.1 |
| 5,277,397 | 1/1994 | Tartaglino .......................... 251/61 |

FOREIGN PATENT DOCUMENTS

| | | | |
|---|---|---|---|
| 3513049 | 11/1986 | Germany ............................ 454/124 |
| 172010 | 7/1989 | Japan ................................ 454/121 |

Primary Examiner—Harold Joyce
Attorney, Agent, or Firm—Patrick M. Griffin

[57] ABSTRACT

A vehicle heating and cooling system has an air duct arrangement that makes efficient use of the available duct space. The initial duct in the system is forced to run through a body area of limited size, and so has a limited cross sectional area and consequently limited air handling capacity. It also contains side window defroster vents that should not be allowed to vent cold air. Therefore, it would be normally not be considered possible to run both hot and cold air through the duct. The arrangement provides a sealed, expansible and collapsible sleeve running through the rigid duct, which expands full size when cold air is fed into it, and which collapses almost completely when hot air is forced past it and through the rigid duct only. Therefore, both hot and cold air can be run through the same volume, and cold air is kept away from the defroster vents.

2 Claims, 2 Drawing Sheets

VEHICLE AIR DISTRIBUTION SYSTEM WITH IMPROVED SPACE UTILIZATION

This invention relates to automotive heating and cooling in general, and specifically to a hot and cold air distribution system that uses available duct space more efficiently.

BACKGROUND OF THE INVENTION

Vehicle heating and cooling systems provide pressurized hot and cold air flows that are ducted to varying points within the vehicle interior, for differing purposes. For example, hot and cold air both need to be delivered to vehicle passengers, but cold air does not have to be delivered to windows for defrosting purposes. If the same ducts were used to distribute both hot and cold air, then some cold air would be wasted out the window defrosting outlets. Since it is more expensive to provide cold air in a vehicle, this would be uneconomic. Therefore, it is generally desirable to provide separate ducts for hot and cold air. Typically, rigid wall ducts for hot and cold air are simply run side by side. This, of course, requires that each of the ducts be large enough in cross sectional area to handle the desired volume of air flow without restriction. In some cases, ducting has to be run through vehicle body locations where there is not sufficient space available to run two side by side ducts, each with the desired cross sectional area.

SUMMARY OF THE INVENTION

The invention provides an air distribution system that can handle heated and cooled air separately while sharing a single available cross sectional area.

In the embodiment disclosed, a standard source of blower fed, pressurized heated or cooled air is supplied selectively, as the operator chooses. A single chambered, rigid main duct of fixed cross sectional area extends from the blower housing to a double chambered duct that has separate, side by side hot and cold passages opening into the main duct. The single chambered duct also has side outlets for to which only heated air should be sent. A sealed, secondary flexible duct runs through the main duct, past the side outlets, and to only the cold air passage of the double chambered duct. A valve mechanism feeds cold air into the flexible duct, or feeds heated air into the main, rigid duct, and past the flexible duct, as the operator so chooses.

If cold air is selected, the flexible duct is expanded out into the shape or the main, rigid duct, using all of the available cross sectional area to feed cold air through the main duct and to the cold air passage of the double chambered rigid duct. In addition, the side outlets of the main duct, where only heated air is wanted, are by-passed. If heated air is selected, the flexible duct collapses to allow heated air to pass through essentially all of the cross sectional area of the main duct and to the hot air passage of the double chambered duct. Heated air does reach the side outlets of the main duct, as well. Therefore, efficient use is made of the available duct space, and cold air is not wasted.

DESCRIPTION OF THE PREFERRED EMBODIMENT

These and other features and advantages of the invention will appear from the following written description, and from the drawings, in which.

Figure 1:
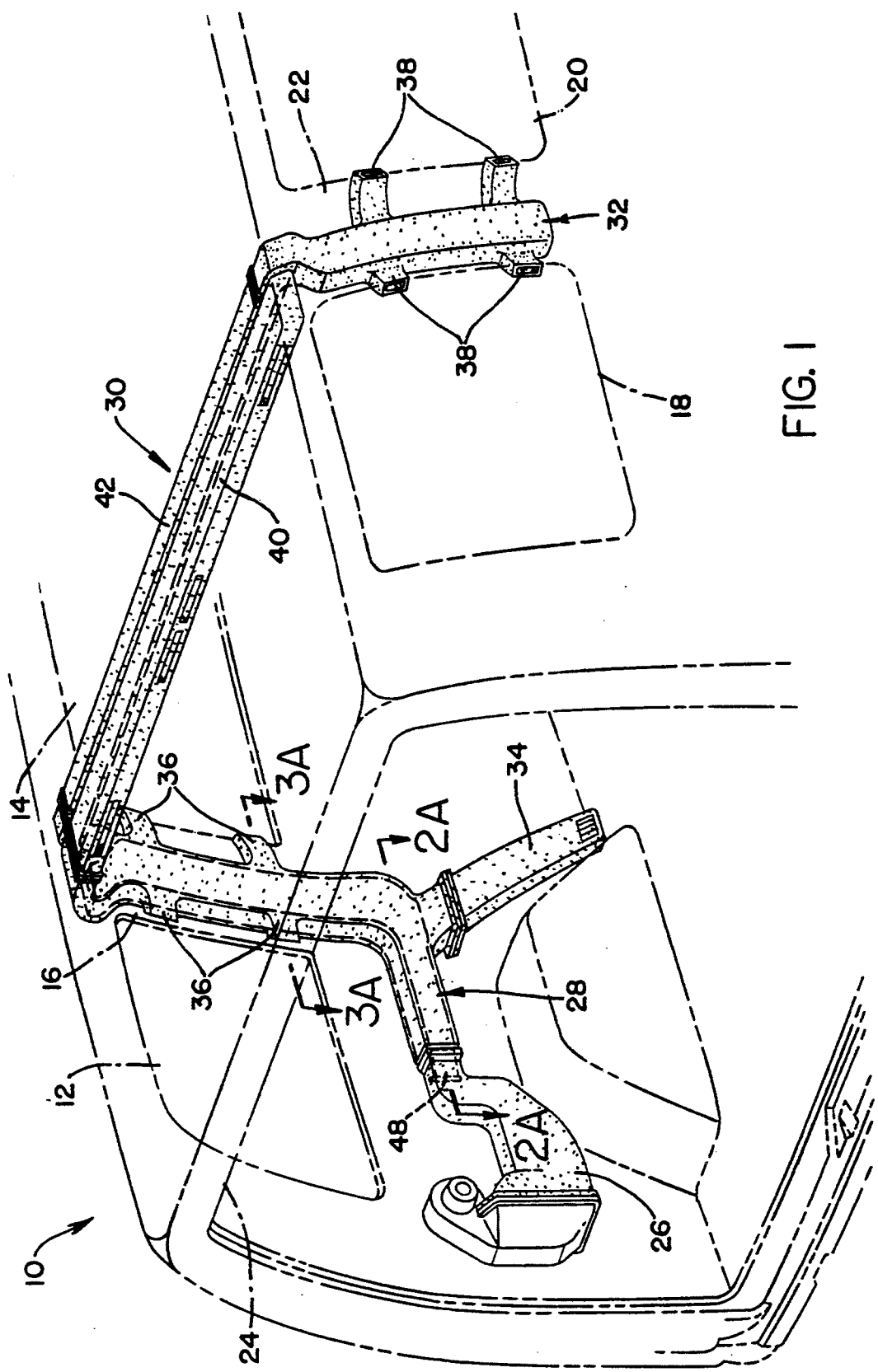
FIG. 1 is a perspective view of a preferred embodiment of an air distribution system according to the invention showing the outlines of a vehicle body and windows.

Referring first to FIG. 1, a vehicle, indicated generally at 10, includes side windows 12 and 14 on the driver side separated by a body pillar 16, side windows 18 and 20 on the passenger side separated by a body pillar 22, and a roof panel 24. An automotive heating and cooling system includes a conventional module 26 which, through non illustrated blower and heat exchangers, selectively provides pressurized heated or cooled air to be distributed throughout the interior of the vehicle 10. The embodiment disclosed is the supplementary rear system found in larger vehicles such as vans, but is not so limited. The air distribution system of the invention includes three rigid ducts, a main, single chambered duct, indicated generally at 28, a double chambered roof duct indicated generally at 30, and an additional single chambered duct indicated generally at 32. The main duct 28 is generally L shaped, and has a number of side outlets, including a floor vent 34 and a plurality of side window vents 36. It is desired to route only heated air to these. Likewise, duct 32 has a plurality of side window vents 38 directed at windows 18 and 20.

Figure 3A:
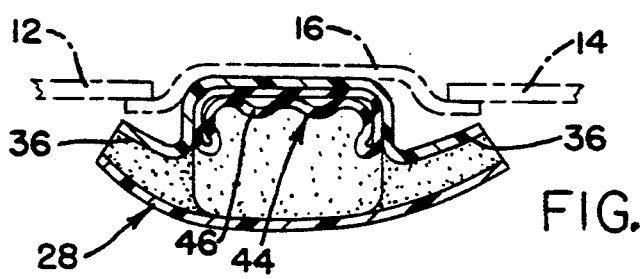
FIG. 3A is a cross section of the main duct taken along the line 3A—3A of FIG. 1 showing the heating condition of the flexible duct.
Figure 3B:
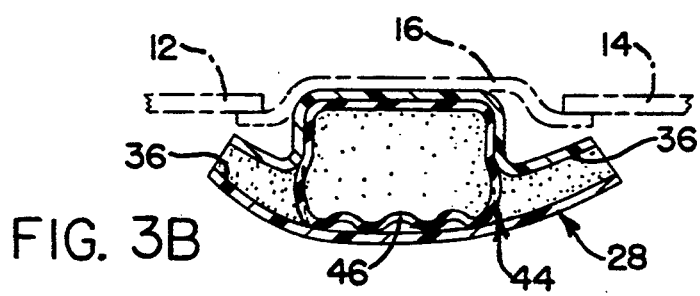
FIG. 3B is a cross section like FIG. 3A, but showing the cooling condition of the flexible duct.
Figure 3C:
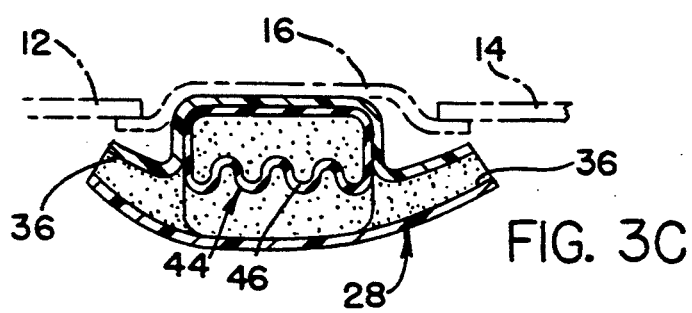
FIG. 3C is a cross section of like FIG. 3A, but showing the condition of the duct when no heating or cooling is taking place.

Still referring to FIG. 1, all of the rigid ducts described, by definition, have a fixed cross sectional area, which represents their basic capacity to carry air flow. Main duct 28 runs along the side pillar 16, which limits its width, and is encased under a non illustrated interior trim panel, which limits its thickness. Consequently, it's cross sectional area is limited. The same space limitation applies to duct 32, which also has window side vents 38 for the other two windows 18 and 20, but does not present a problem, as duct 32 carries only heated air. The double chambered duct 30 is not so limited in total cross sectional area, however. It includes two side by side passages, cold air passage 40 and hot air passage 42. The two passages 40 and 42 both open at one end into the main duct 28 through a forked or Y connection near the juncture of side pillar 16 and roof panel 24. At the other end, the cold air passage 40 dead heads at duct 32, while hot air passage 42 opens into duct 32. Cold air passage 40 is vented, so as to expel air above the passengers, but hot air passage 42 is not. The passages 40 and 42 are limited in thickness, since they cannot restrict headroom, but are not so limited in width, and so may easily be designed to each have all the cross sectional area needed to give sufficient air flow capacity. Thus, cold air passage 40 alone has a cross sectional area comparable to main duct 28, and both passages 40 and 42 of duct 30 together have significantly more. Nevertheless, the small main duct 28 is able to serve the larger duct 30, through additional structure, described next. Referring next to FIGS. 1 and 3C, a secondary flexible duct, indicated generally at 44, is an expansible and contractible sleeve that runs through duct 28, end to end, and is sealed except for its open ends. Flexible duct 44 could be molded of any suitable elastomer, rubber reinforced cloth, or other flexible material capable of handling the temperatures involved. In the free state, flexible duct 44 would have the same general L shaped configuration and width as the inside of rigid duct 28, but less thickness. As such, it has a basically rectangular cross section, comprising three flat sides abutted with the inner walls of duct 28, and a corrugated side 46 that runs generally across the center of duct 28, as best seen in FIG. 3C. The three flat sides would be glued or otherwise bonded to the inside of duct 28 to the extent necessary to keep it in place. The inlet end of flexible duct 44 rests near the juncture of module 26 and rigid duct 28, and is also associated with other structure described below. The opposite end of flexible duct 44 feeds into the cold air passage 40 only of duct 30. It should be noted that flexible duct 44 has no openings to the side vents 36 or floor vent 34.

Figure 2A:
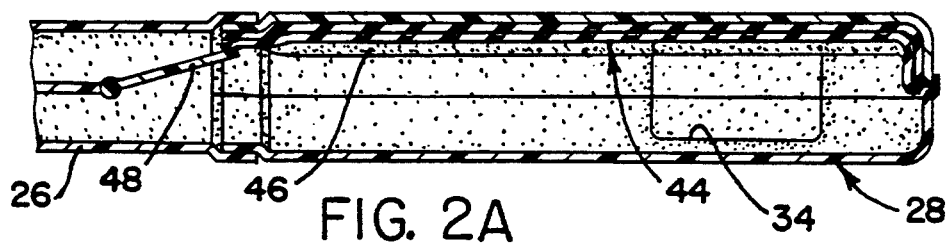
FIG. 2A is a cross section of the main duct taken along the line 2A—2A of FIG. 1 showing the heating condition of the flexible duct.
Figure 2B:
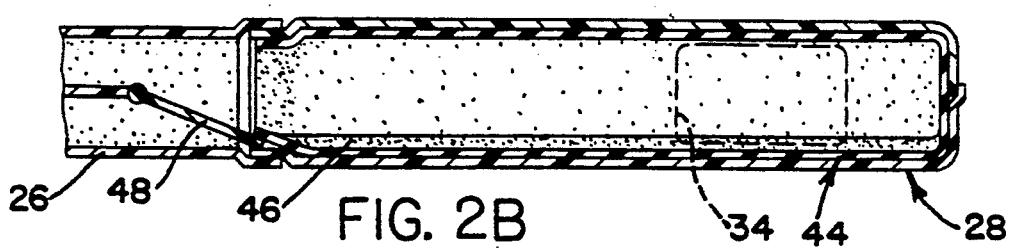
FIG. 2B is a cross section like FIG. 2A, but showing the cooling condition of the flexible duct.

Referring next to FIGS. 2A through 3C, the operation of the invention is illustrated. A pivoted valve door 48 is adapted to swing side to side near the inlet end of duct 28, in response to operator demand. In the FIG. 2A position, hot air only is forced from module 26 toward duct 28, while in the FIG. 2B position, cold air is provided. Normally, air of either type would feed directly into duct 28. Here, however, the terminal edge of door 48 is glued flat the inlet end edge of flexible duct wall 46. Consequently, the swinging of valve door 48 to the hot air position (2A) also acts to collapse and close the inlet end of flexible duct 44, while swinging to the cold air position (2B) tends to expand and open flexible duct 44. When heating is called for, as seen in FIGS. 2A and 3A, the forced, heated air bypasses flexible duct 44, and is fed instead into the empty space between corrugated wall 46 and rigid duct 28. Consequently, flexible duct 44 is collapsed along its length within duct 28, and almost the entire cross sectional area of duct 28 is available to carry heated air. Corrugated wall 46 is not completely flatted, so as to prevent flexible duct 44 from sticking in its collapsed condition. As flexible duct 44 collapses, the side vents 36 and floor vent 34 are unblocked, and some heated air exits through them to the floor and to windows 12 and 14. The balance of the heated air goes cross car through passage 42 without loss, and then to the remaining duct 32 and out its side vents 38 to windows 18 and 20. When cooling is called for, as seen in FIGS. 2B and 3B, the forced, cooled air is fed into flexible duct 44, which balloons out, filling out the cross sectional area of rigid duct 28. Almost all of that cross sectional area is then available to carry cooled, forced air. As before, corrugated wall 46 is not completely flattened, so as to prevent sticking. None of the cooled air reaches vents 34 or 36, but instead is fed into cold air passage 40. When no heating or cooling is called for, and door 48 sits more or less in the middle, the flexible duct wall 46 also rests in the center, free state position (3C)

In summary, the limited cross sectional area within duct 28 is very efficiently used, serving double duty, in effect, to carry either heated or cooled air, and to direct it only where needed. Variations in the preferred embodiment could be made. A flexible duct like 44 could be used to route both hot and cold air through a duct of limited cross sectional area, regardless of whether that duct had side vents like 36 from which it was desired to block cold air. A duct like 44 could be effectively provided by attaching a 3 walled flexible sleeve in sealed fashion within a rigid duct, such as by continuous glue seams or continuous crimping. The complete, four sided duct 44 is easy to manufacture, however, and, being inherently sealed all along its length, may be glued within the rigid duct 28 with far less care than a three sided duct. The corrugated wall 46 might not be absolutely necessary, but is also easy to provide, and does help prevent sticking. A valve member other than the door 48 could be used, so long as it fed the two different air flows into the flexible duct or into the space between the rigid and flexible ducts selectively. Therefore, it will be understood that it is not intended to limit the invention to just the embodiment disclosed.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In an automotive heating and cooling system having a selective source of heated and cooled pressurized air flows, an air distribution system, comprising, a main, rigid air duct having a fixed cross sectional area and at least one side outlet along its length, a secondary, flexible air duct extending through said main duct past said side outlet and sealed therefrom, said flexible duct having an expanded state that substantially fills said main duct cross sectional area and a collapsed state that substantially opens said main duct cross sectional area, and, a valve member to selectively feed one of said heated or cooled pressurized air flows to said flexible duct, thereby expanding said flexible duct and bypassing said main duct side outlet, and to feed the other of said heated or cooled pressurized air flows past said flexible duct and directly into said main duct, thereby collapsing said flexible duct to uncover said main duct side outlet, whereby, heated and cooled pressurized air flows may be carried selectively within the same basic cross sectional duct area, thereby minimizing total duct area, while allowing only one of said pressurized air flows to exit said main duct side outlet.

2. In an automotive heating and cooling system having a selective source of heated and cooled pressurized air flow, an air distribution system, comprising, a single chambered, rigid air duct having a fixed cross sectional area, a double chambered air duct having separate hot and cold air passages opening into said single chamber duct, a sealed, secondary flexible air duct extending through said single chambered duct to said double chambered duct cold air passage, said flexible duct having an expanded state that substantially fills said single chambered duct cross sectional area and a collapsed state that substantially opens said single chambered duct cross sectional area, and, a valve member to selectively feed cooled pressurized air flow to said flexible duct, thereby expanding said flexible duct and bypassing said single chambered duct into said double chambered duct cold air passage, and to feed heated pressurized air flow past said flexible duct and directly into said single chambered duct, thereby collapsing said flexible duct and sending heated air through both said single chambered air duct and said double chambered air duct hot air passage.

* * * * *